(12) United States Patent
Liu et al.

(10) Patent No.: US 11,515,705 B2
(45) Date of Patent: Nov. 29, 2022

(54) SMART CHARGING SCHEDULING APPARATUS AND METHOD FOR ELECTRIC VEHICLE

(71) Applicant: Bayerische Motoren Werke Aktiengesellschaft, Munich (DE)

(72) Inventors: Bo Liu, Beijing (CN); Thomas Page, Beijing (CN); Qiao Ding, Beijing (CN); Qing Yang, Augsburg (DE); Christoph Tomoki Hein, Beijing (CN); Stefan Groesbrink, Paderborn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 469 days.

(21) Appl. No.: 16/684,698

(22) Filed: Nov. 15, 2019

(65) Prior Publication Data
US 2020/0082352 A1    Mar. 12, 2020

Related U.S. Application Data

(63) Continuation of application No. PCT/CN2017/084566, filed on May 16, 2017.

(51) Int. Cl.
*B60L 53/62* (2019.01)
*B60L 53/66* (2019.01)
(Continued)

(52) U.S. Cl.
CPC ............ *H02J 3/003* (2020.01); *B60L 53/62* (2019.02); *B60L 53/63* (2019.02); *B60L 53/66* (2019.02);
(Continued)

(58) Field of Classification Search
CPC ..... G06Q 10/1095; B60L 53/62; B60L 53/63; B60L 53/66; B60L 58/12; G06N 20/00;
(Continued)

(56) References Cited

U.S. PATENT DOCUMENTS

| | | | |
|---|---|---|---|
| 2015/0291047 A1* | 10/2015 | Saito | B60L 53/66 320/109 |
| 2017/0050527 A1 | 2/2017 | Tsuchiya | |

FOREIGN PATENT DOCUMENTS

| | | |
|---|---|---|
| CN | 103559567 A | 2/2014 |
| CN | 104241720 A | 12/2014 |

(Continued)

OTHER PUBLICATIONS

International Search Report (PCT/ISA/210) issued in PCT Application No. PCT/CN2017/084566 dated Feb. 2, 2018 (two (2) pages).

(Continued)

*Primary Examiner* — Lincoln D Donovan
*Assistant Examiner* — Alex W Lam
(74) *Attorney, Agent, or Firm* — Crowell & Moring LLP

(57) ABSTRACT

The present disclosure provides a new and improved method and apparatus of scheduling for a charging infrastructure serving a plurality of electric vehicles. A computer-implemented method for scheduling a charging infrastructure serving a plurality of electric vehicles is provided, in which a prediction for a usage pattern of the charging infrastructure is made with a context based on historical usage patterns of the charging infrastructure and the contexts of the historical usage patterns, and a schedule scheme for deciding a distribution of charging spots of the charging infrastructure among the electric vehicles is determined based on the predicted usage pattern.

19 Claims, 9 Drawing Sheets

(51) Int. Cl.
*B60L 53/63* (2019.01)
*G06Q 10/10* (2012.01)
*G06N 20/00* (2019.01)
*B60L 58/12* (2019.01)
*H02J 3/00* (2006.01)
*H02J 3/14* (2006.01)
*H02J 7/00* (2006.01)
*H02J 13/00* (2006.01)

(52) U.S. Cl.
CPC .............. *B60L 58/12* (2019.02); *G06N 20/00* (2019.01); *G06Q 10/1095* (2013.01); *H02J 3/144* (2020.01); *H02J 7/0013* (2013.01); *H02J 13/00016* (2020.01); *H02J 13/00022* (2020.01); *H02J 2310/48* (2020.01)

(58) Field of Classification Search
CPC ........... H02J 13/00016; H02J 13/00022; H02J 3/144; H02J 2310/48; H02J 2310/60; H02J 3/003; H02J 7/0013; Y02B 70/30; Y02B 70/3225; Y02B 90/20; Y02E 60/00; Y02T 90/167; Y02T 90/168; Y02T 10/70; Y02T 10/7072; Y02T 90/12; Y02T 90/16; Y04S 20/221; Y04S 20/222; Y04S 40/124; Y04S 40/126; Y04S 10/126; Y04S 30/12
See application file for complete search history.

(56) References Cited

FOREIGN PATENT DOCUMENTS

| | | |
|---|---|---|
| CN | 105555587 A | 5/2016 |
| CN | 106467034 A | 3/2017 |

OTHER PUBLICATIONS

Written Opinion (PCT/ISA/237) issued in PCT Application No. PCT/CN2017/084566 dated Feb. 2, 2018 (three (3) pages).

\* cited by examiner

SMART CHARGING SCHEDULING APPARATUS AND METHOD FOR ELECTRIC VEHICLE

CROSS REFERENCE TO RELATED APPLICATION

This application is a continuation of PCT International Application No. PCT/CN2017/084566, filed May 16, 2017, the entire disclosure of which is herein expressly incorporated by reference.

BACKGROUND AND SUMMARY OF THE INVENTION

The present disclosure relates in general to the field of charging of an electric vehicle, and in particular, to a smart charging scheduling method and apparatus for electric vehicle.

With development of new energy vehicles, such as an electric vehicle, the requirement in charging infrastructures, especially in mega cities, is increasing significantly. As for a charging infrastructure with multiple charging spots in the prior art, normally, the electric vehicles requiring charging wait in a line and when the electric vehicle on one of the charging spots is fully charged and leaves the charging infrastructure, the electric vehicle at the first place of the line moves to the charging spots for charging. Thus, there has not been a smart scheduling method for distributing the charging spots among the electric vehicles.

The present disclosure aims to provide a new and improved method and apparatus of scheduling for a charging infrastructure serving a plurality of electric vehicles.

In accordance with a first exemplary embodiment of the present disclosure, a computer-implemented method for scheduling a charging infrastructure serving a plurality of electric vehicles is provided, characterized in comprising: making a prediction for a usage pattern of the charging infrastructure with a context based on historical usage patterns of the charging infrastructure and the contexts of the historical usage patterns, and determining a schedule scheme for deciding a distribution of charging spots of the charging infrastructure among the electric vehicles based on the predicted usage pattern.

In an example of the present embodiment, the prediction for the usage pattern of the charging infrastructure may be made using machine learning method or a data mapping method.

In an example of the present embodiment, the schedule scheme may be determined based on a correspondence between the usage pattern and the schedule scheme.

In an example of the present embodiment, the method may further comprise observing a real usage pattern of the charging infrastructure, and wherein the predicted usage pattern is adjustable based on the real usage pattern.

In an example of the present embodiment, the schedule scheme may comprise at least one of first come first serve scheme, round robin scheme, shortest job first scheme, shortest remaining time first scheme, first priority first scheme, first go first serve scheme, mixed schemes of any of these schedule schemes and transition schemes from one of the schedule schemes to another.

In an example of the present embodiment, the usage pattern of the charging infrastructure may comprise at least one of: a number of the electric vehicles demanding charging, a rate of change in the number of the electric vehicles, required power of the electric vehicle, and residence time of the electric vehicle.

In an example of the present embodiment, the context of the usage pattern of the charging infrastructure may comprise at least one of: a location of the charging infrastructure, time of day, day of week, weather, holiday or not, and whether there is an event taking place around the charging infrastructure.

In an example of the present embodiment, the method may further comprise: deciding distribution of the charging spots among the electric vehicles based on the schedule scheme and information about the electric vehicles.

In an example of the present embodiment, the information about the electric vehicles may comprise at least one of a time at which the electric vehicle arrives at the charging infrastructure, a current state of charge, a desired state of charge, a desired charging energy, a desired pickup time, an accumulated charging time, remaining job length of the electric vehicle, priority of the electric vehicle, and the distance between the electric vehicle and the charging spot.

In an example of the present embodiment, the charging infrastructure may comprise a plurality of supply phases for providing power to any of the charging spots, and the method may further comprise: determining distribution of the supply phases among the charging spots based on at least one of: status of each supply phase and the information about the electric vehicles on the charging spots which are being powered by each charging supply.

In an example of the present embodiment, the status of each supply phase may comprise at least one of: an available power of the supply phase and a current of the supply phase.

In an example of the present embodiment, the method may further comprise: determining distribution of an available power of the charging phase among the charging spots based on power limitations of the supply phase and the information about the electric vehicles on the charging spots which are being powered by each charging supply.

In an example of the present embodiment, the electric vehicle may be an autonomous vehicle and the charging infrastructure may have an autonomous charger.

In accordance with a second exemplary embodiment of the present disclosure, a scheduling apparatus for a charging infrastructure serving a plurality of electric vehicles is provided, characterized in comprising: a memory, configured to store a series of computer executable instructions; and a processor, configured to execute the series of computer executable instructions, wherein the series of computer executable instructions, when executed by the processor, cause the processor to perform steps of any of the above mentioned methods.

In accordance with a third exemplary embodiment of the present disclosure, a non-transitory computer readable medium having instructions stored thereon that, when executed by a processor, cause the processor to perform steps of any of the above mentioned methods.

Further scope of applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from the following detailed description.

Other objects, advantages and novel features of the present invention will become apparent from the following detailed description of one or more preferred embodiments when considered in conjunction with the accompanying drawings.

BRIEF DESCRIPTION OF THE DRAWINGS

The above and other aspects and advantages of the present disclosure will become apparent from the following detailed description of exemplary embodiments taken in conjunction with the accompanying drawings which illustrate, by way of example, the principles of the present disclosure. Note that the drawings are not necessarily drawn to scale.

DETAILED DESCRIPTION OF THE DRAWINGS

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

The term "electric vehicle" used through the specification refers to a vehicle which is powered, at least partially, by electric and can be charged through a charging infrastructure. The "electric vehicle" is not limited to a car, a truck, a bus, or the like. The term "A or B" used through the specification refers to "A and B" and "A or B" rather than meaning that A and B are exclusive, unless otherwise specified.

Figure 1:
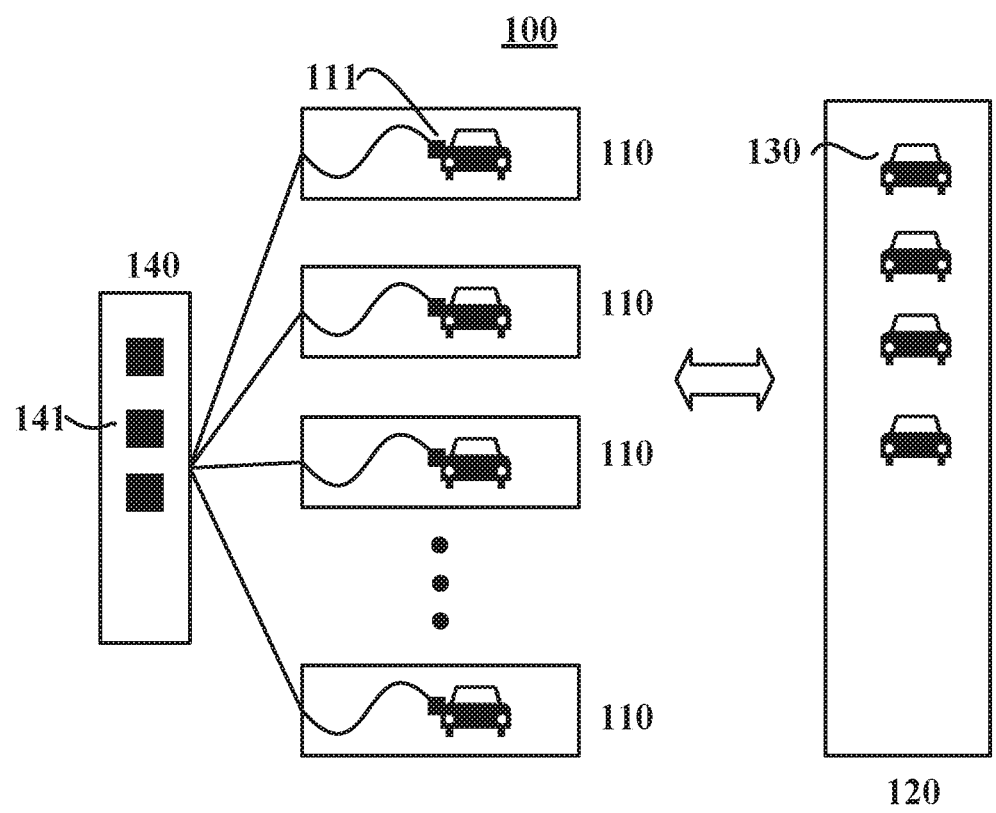
FIG. 1 shows a schematic diagram illustrating a charging infrastructure serving a plurality of electric vehicles in accordance with an exemplary embodiment of the present disclosure.

Referring first to FIG. 1, there is shown a schematic diagram illustrating a charging infrastructure serving a plurality of electric vehicles in accordance with an exemplary embodiment of the present disclosure. The charging infrastructure 100 comprises a plurality of charging spots 110 and a plurality of waiting areas 120. The electric vehicles 130 can be disposed in either the charging spots 110 or the waiting areas 120, and are movable between the charging spots 110 and the waiting areas 120. Each charging spot 110 has at least one charger 111, and the electric vehicles 130 in the charging spots 110 can be charged via the charger 111. One charging infrastructure 100 may comprise for example tens or even hundreds of charging spots. The charging infrastructure 100 comprises a power system 140 which provides electric power to each of the charging spots. The power system 140 may be a multi-phase electric power system 140 comprising several supply phases 141. Each of the supply phases 141 transfers one alternating current phase, and the multiple alternating current phases are offset in time. In an embodiment of the present disclosure, one charging infrastructure 100 comprises for example three supply phases. In another embodiment of the present disclosure, one charging infrastructure 100 comprises for example more than three supply phases. One or more supply phases 141 can be assigned to one charging spot 110. Meanwhile, one supply phase 141 can empower multiple charging spots 110.

Figure 2:
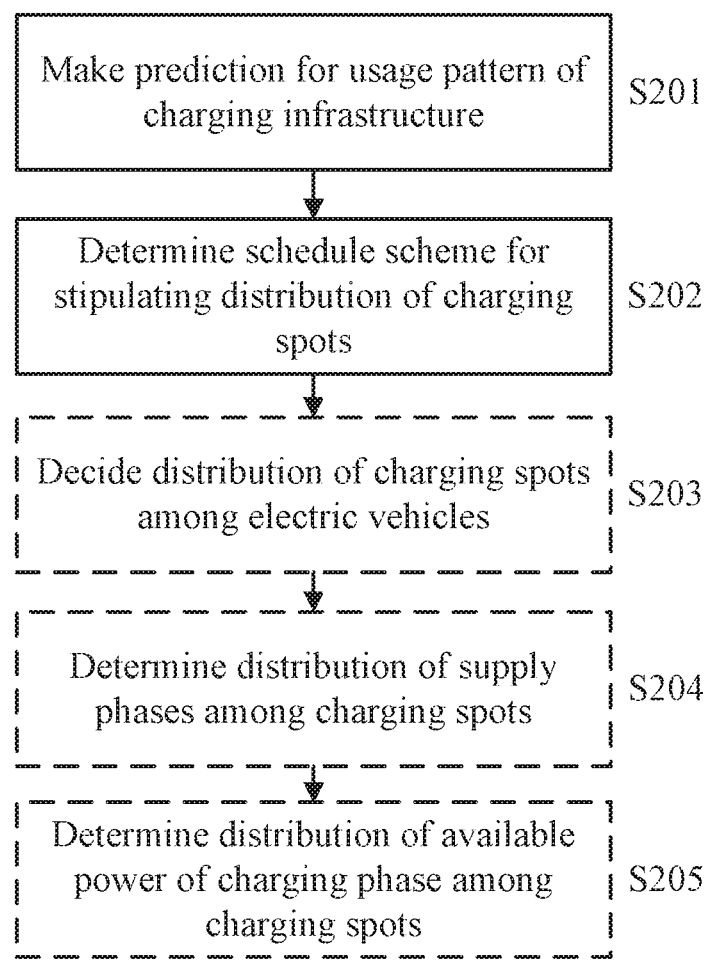
FIG. 2 shows a flow chart illustrating a scheduling method 200 for a charging infrastructure in accordance with an exemplary embodiment of the present disclosure.

Referring to FIG. 2, there is shown a flow chart illustrating a scheduling method 200 for a charging infrastructure in accordance with an exemplary embodiment of the present disclosure.

At step S201, a prediction for a usage pattern of the charging infrastructure with a context is made based on historical usage patterns of the charging infrastructure and the contexts of the historical usage patterns.

In the present disclosure, "usage pattern of the charging infrastructure" is used to describe the pattern according to which the electric vehicles use the charging infrastructure. The usage pattern of the charging infrastructure may comprise any parameters that can reflect the pattern in which the electric vehicles use the charging infrastructure. For example, the parameters of the usage pattern of the charging infrastructure comprise at least one of: a number of the electric vehicles demanding charging, a rate of change in the number of the electric vehicles, required power of the electric vehicle, residence time of the electric vehicle (i.e., the time length during which the electric vehicle will stay at the charging infrastructure), and so on. For example, the usage pattern of the charging infrastructure can be described as: "about one hundreds of electric vehicles are waiting for charging," "about two hundreds of electric vehicles arrives at the charging infrastructure within one hour," "about 75% of the electric vehicles requires full charge," "an average required power of the electric vehicles is about 60 kwh," "an average residence time of the electric vehicles is about 3 hours," and so on. In addition, the description of the usage pattern of the charging infrastructure can be exact values or even specific to each electric vehicle.

Any other parameter can be comprised in the "usage pattern" as long as it can reflect the pattern in which the electric vehicles use the charging infrastructure.

In addition, the usage pattern of the charging infrastructure is correlated with the context thereof, which refers to a set of environment factors of the usage pattern. The context of the usage pattern comprises a variety of information, including at least one of a location of the charging infrastructure, time of day, day of week, weather, holiday or not, whether there is an event taken place around the charging infrastructure, and so on. One can conceive of any other information that can be comprised in the context of the usage pattern of the charging infrastructure.

There is certain correspondence between the usage pattern and the context thereof. In one embodiment of the specification, each context corresponds to one corresponding usage pattern, and several contexts may correspond to the same usage pattern. That is to say, there is a 1-to-n correspondence between the usage pattern and the contexts. In other words, if the contexts are the same, the corresponding usage pattern will be the same as well. For example, for a charging infrastructure in a residential area, the usage pattern will commonly be the same in the evening of every Monday. In addition, different contexts may correspond to different usage pattern. As an example, a charging infrastructure in a shopping mall and a charging infrastructure in a residential area will have usage patterns which are different from each other. Also, the usage patterns of a charging infrastructure in a shopping mall during lunch time, in the morning, in a rainy day, in a sunny day, during working days and during weekend might be different from each other as well.

In the present disclosure, the term "historical usage pattern of the charging infrastructure" refers to the real usage pattern that has been recorded for the charging infrastructure. The real usage pattern can be observed by, for example, a counter that counts the electric vehicle at the charging infrastructure and/or a receiver that receives information from the costumer relating to the required power and residence time of the electric vehicle, and recorded in a memory of a computing device. The term "the contexts of the historical usage patterns" refers to the real context of the historical usage pattern, i.e., the real context when the historical usage pattern occurs. The real context can be inputted by an operator, sensed by sensors, retrieved from any sources. Based on the recorded usage pattern and the context thereof, the prediction of a usage pattern with specific context can be made in a variety of ways. The historical usage pattern of the charging infrastructure and the context of the historical usage pattern might be deemed as the "experiential data" used for predicting the usage pattern.

In one embodiment of the present disclosure, machine learning is used to predict the usage pattern. As has been well known in the technical filed of computer science, machine learning builds a model by learning from training examples and predicts a new output based on the model. In this embodiment, the usage pattern with a context can be predicted using machine learning algorithm based on historical usage patterns of the charging infrastructure and the context of the historical usage patterns.

Figure 3:
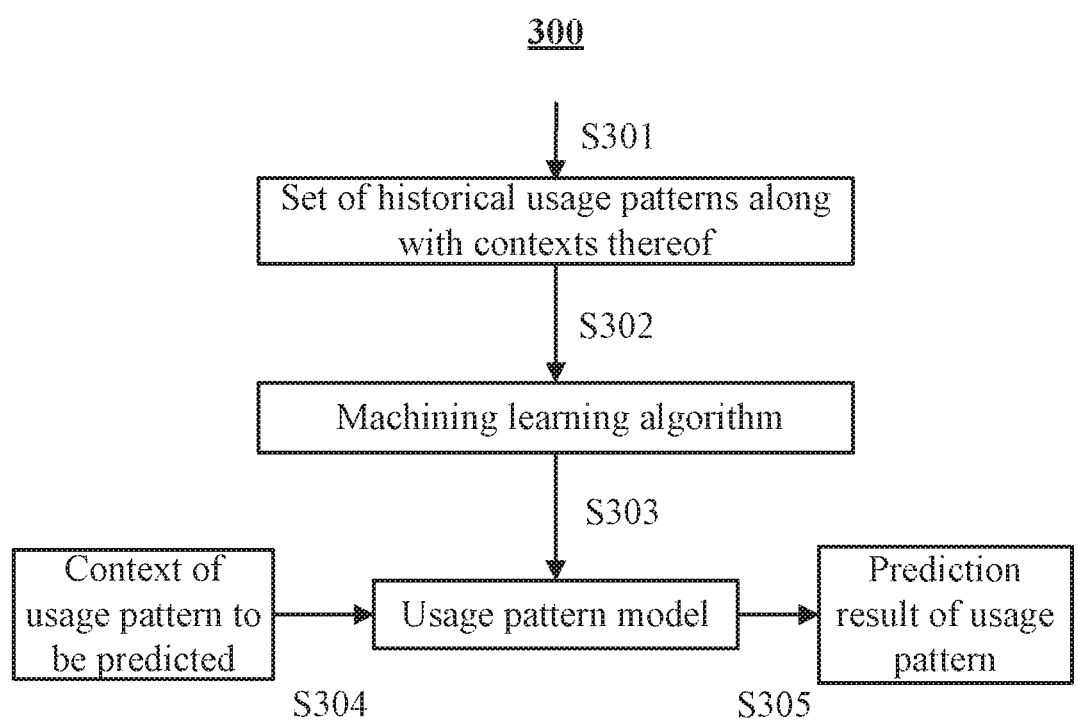
FIG. 3 shows a flow chart illustrating a method 300 for predicting the usage pattern with a context based on historical usage pattern and the context thereof using machine learning algorithm in accordance with an exemplary embodiment of the present disclosure.

Now referring to FIG. 3, there is shown a flow chart illustrating a method 300 for predicting the usage pattern with a context based on historical usage pattern and the context thereof using machine learning algorithm in accordance with an exemplary embodiment of the present disclosure.

At step S301, a set of historical usage patterns along with the contexts thereof is provided. In one embodiment of the present disclosure, the historical usage patterns and the contexts can be real data which is recorded for the charging infrastructure of which the usage pattern is to be predicted. In another embodiment of the present disclosure, the historical usage patterns and the contexts can be real data which is recorded for another charging infrastructure, which is similar to the charging infrastructure of which the usage pattern is to be predicted. The term "similar" is used here to indicate that under similar contexts, these two charging infrastructures have similar usage patterns such that the real historical usage pattern of one of them can be used as the historical usage pattern of the other one of them.

At step S302, the set of historical usage patterns along with the contexts thereof are inputted into the machining learning algorithm. The machining learning algorithm may be one of those known in the prior art, comprising the supervised learning algorithms, the unsupervised learning algorithms, semi-supervised learning algorithms and reinforcement learning algorithms. In particular, the algorithms includes at least one of: decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems and so on.

At step S303, a usage pattern model is built by the machine learning algorithm. By using the model, one context is correlated with one corresponding usage pattern of the charging infrastructure.

At step S304, the context of the usage pattern to be predicted is provided to the model. In one embodiment of the present disclosure, the usage pattern to be predicted is the current usage pattern of the charging infrastructure, while in another embodiment of the present disclosure, the usage pattern to be predicted may be any usage pattern, which can be the usage pattern in the future, for example, in the next hours, the usage pattern with hypothetical context assumed by the user, or even the usage pattern in the past.

At step S305, the prediction result of the usage pattern is output from the model. By using the model, the inputted context will produce an output, which is the usage pattern to be predicted.

The flow chart and the steps as shown in FIG. 3 are just simple examples for machine learning algorithm, and the person skilled in the art will conceive of any processes and steps to make the prediction for the usage pattern of the charging infrastructure using machine learning.

In another embodiment of the present disclosure, the prediction for a usage pattern of the charging infrastructure is made by mapping the historical usage pattern and the context thereof.

Figure 4:
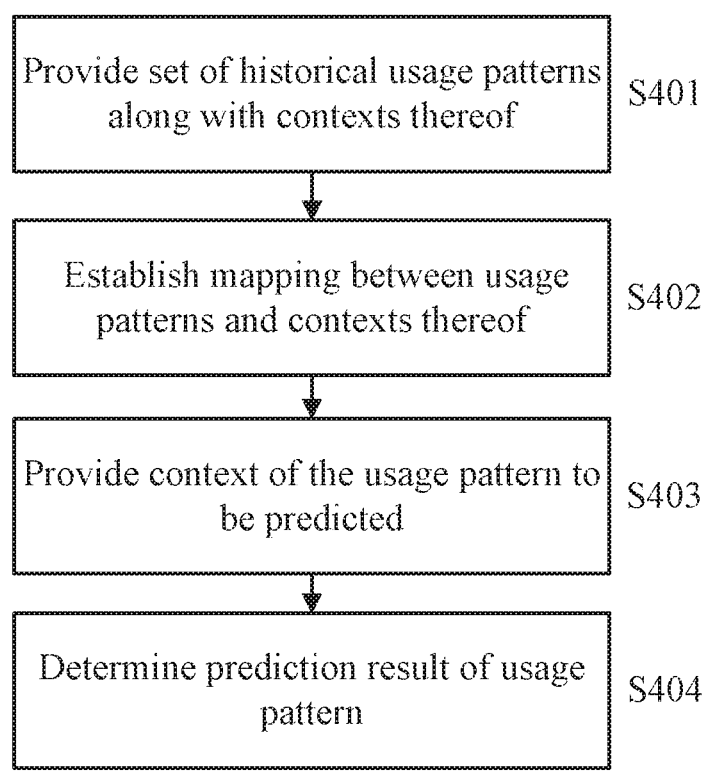
FIG. 4 shows a flow chart illustrating a method 400 for predicting the usage pattern with a context based on historical usage pattern and the context thereof using data mapping in accordance with an exemplary embodiment of the present disclosure.

Now referring to FIG. 4, there is shown a flow chart illustrating a method 400 for predicting the usage pattern with a context based on historical usage pattern and the context thereof using data mapping method in accordance with an exemplary embodiment of the present disclosure.

At step S401, a set of historical usage patterns along with the contexts thereof is provided. This step is similar to the step S301, and thus the explanation thereof is omitted here.

Then, at step S402, a mapping between the usage patterns and the contexts thereof is established. As had mentioned above, the mapping between the usage patterns and the contexts thereof is a 1-to-n mapping, and thus for each context, there will be one corresponding usage pattern.

At step S403, the context of the usage pattern to be predicted is provided. This step is similar to the step S304, and thus the explanation thereof is omitted here.

At step S404, according to the mapping between the usage patterns and the contexts thereof, the prediction result of the usage pattern is determined based on the provided context.

The flow chart and the steps as shown in FIG. 4 are just simple examples using data mapping, and the person skilled in the art will conceive of any process and steps to make the prediction for the usage pattern of the charging infrastructure using data mapping.

In addition to the embodiments listed above, the person skilled in the art can conceive of any other method for predicting the usage pattern with a context based on historical usage pattern and the context thereof, and these method are all covered by the scope of the present disclosure.

In one embodiment of the present disclosure, the historical usage pattern and the contest thereof can be updated periodically or manually pursuant to the instruction from, for example, the operator of the charging infrastructure. When the historical usage pattern and the contest thereof are updated, for example, the model built by machine learning method and/or the mapping used in the data mapping method can be updated as well.

In one embodiment of the present disclosure, the predicted usage pattern can be adjusted in view of the real usage pattern of the charging infrastructure. The current and historical real usage pattern can be observed by, for example, a counter that counts the electric vehicle at the charging infrastructure and/or a receiver that receives information from the costumer relating to the required power and residence time of the electric vehicle, and recorded. If the differences between the predicted current usage pattern and the real current usage pattern under the same context are large, for example, the number of the electric vehicle currently at the charging infrastructure in the real current usage pattern is much larger than that in the predicted usage pattern (e.g., 400 versus 200), it indicates that the real current usage pattern of the charging infrastructure is diverged from the experiential data used for predicting the usage pattern, and thus it is suggested to adjust the predicted usage pattern in view of the real usage pattern.

For example, the usage pattern in the future, for example, in the next hours and the current usage pattern are predicted, and the real current usage pattern is observed as well. However, by comparing the predicted current usage pattern and the real current usage pattern, it is noted that the differences between the predicted current usage pattern and the real current usage pattern are large, for example, the number of the electric vehicle currently at the charging infrastructure in the real current usage pattern is much larger than that in the predicted usage pattern (e.g., 400 versus 200). Then, the usage pattern in the future can be adjusted in view of the real usage pattern, for example, by increasing the number of the electric vehicle demanding charging. Similarly, the other parameters relating to the usage pattern, for example, the rate of change in the number of the electric vehicle, the required power of the electric vehicle, and/or the residence time of the electric vehicle, can be adjusted as well.

In another embodiment of the present disclosure, in addition to the real current usage pattern, the real usage pattern in the past can also be used to adjust the predicted usage pattern.

Now referring back to FIG. 2, at step S202, a schedule scheme for deciding a distribution of charging spots of the charging infrastructure among the electric vehicles is determined based on the predicted usage pattern of the charging infrastructure.

The distribution of charging spots of the charging infrastructure among the electric vehicles defines which and when the charging spot 110 is occupied by the electric vehicles 130 and which electric vehicle 130 is to be moved to the charging spot 110, and for each charging spot, it comprises at least one of: the charging spot is occupied by which electric vehicle, when the charging spot is occupied by the electric vehicle, a time length of the occupation of charging spot by the electric vehicle, which electric vehicle is moved from the waiting area to the charging spot to replace the previous electric vehicle, and so on. There are a variety of schedule scheme for deciding the distribution of charging spots among the electric vehicles. In one embodiment of the present disclosure, the schedule scheme comprises at least one of first come first serve (FCFS) scheme, round robin scheme, shortest job first (SJF) scheme, shortest remaining time first (SRTF) scheme, first priority first (FPF) scheme, first go first serve (FGFS) scheme, the mixed scheme of any of these schedule schemes and the transition scheme from one of the schedule schemes to another.

Below, the charging schemes will be described with reference to the examples under the same circumstances, which are as follows: there are two charging spots, N_1 and N_2 in the charging infrastructure; electric vehicles A and B arrive at the charging infrastructure at time 0, while electric vehicles C, D and E arrive at the charging infrastructure after time 0 and before time 1; and the job length, i.e., the number of the time units required for the charging to be finished, of electric vehicles A, B, C, D and E is 4, 2, 1, 3 and 2, respectively. In the present disclosure, whether the charging of the electric vehicle is finished can be determined according to a variety of criterions, comprising at least one of: whether the electric vehicle is fully charged, whether the state of charge of the electric vehicle reaches the value set by the customer (e.g., the driver of the electric vehicle) or the operator of the charging infrastructure, whether the desired energy has been charged, whether the desired pickup time is reached and so on.

In an embodiment of the present disclosure, for a first come first serve (FCFS) scheme, among the electric vehicle demanding for charging, the charging spots are distributed to the electric vehicle which arrives first in time. Then, the charging of the electric vehicle will be removed from the charging spot after the charging of the electric vehicle is finished. Thereafter, the electric vehicle arriving earliest among the rest of electric vehicles is moved to the charging spot for charging.

Figure 5A:
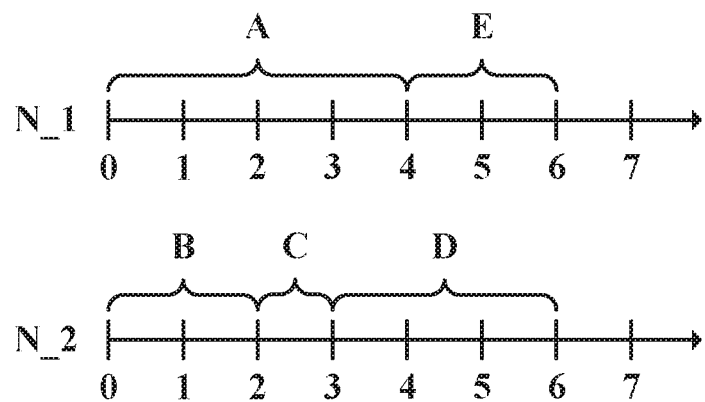
FIGS. 5A-5D show examples for the charging schemes in accordance with an exemplary embodiment of the present disclosure.

Now referring to FIG. 5A-5D, there is shown examples for the charging schemes in accordance with an exemplary embodiment of the present disclosure. FIG. 5A shows an example for first come first serve (FCFS) scheme. As shown in the figure, there are two horizontal axes which represent charging spots N_1 and N_2, respectively. The axes are time lines and each scale on the axes denotes one time unit. At the beginning, electric vehicles A and B are charged on charging spots N_1 and N_2, respectively. Then, after the charging of the electric vehicle B is finished at time 2, electric vehicle C is moved to charging spot N_2. Then, after the charging of the electric vehicle C is finished at time 3, electric vehicle D is moved to charging spot N_2. Then, after the charging of the electric vehicle A is finished at time 4, electric vehicle E is moved to charging spot N_1. Finally, the charging jobs of the electric vehicles D and E end at time 6.

The first come first serve (FCFS) scheme is simple and can be deemed as being a fair scheme, since it follows the convention of orderly queuing. In addition, the FCFS scheme can be transparent to the customer, such that he/she can make the decision if he/she is willing to wait and use the charging infrastructure.

In an embodiment of the present disclosure, for a round robin scheme, a time slot is defined on each charging spot, and each time slot can be used by an electric vehicle to charge. The electric vehicles are ordered in a charging queue based on the time at which they arrives at the charging infrastructure and are moved to the charging spot according to the queue. Specifically, at the end of each time slot, the electric vehicle on charging on the charging spot will be moved to the waiting area and it will be located at the end of the queue, and the first electric vehicle in the queue replaces it on the charging spot. That is to say, the round robin scheme runs in a cyclic model. After the charging of the electric vehicle is finished, it is removed from the queue. It would be noted that the term "charging queue" means the order of the electric vehicles waiting for charging and does not necessarily means that the electric vehicles are physically arranged in a line.

Figure 5B:
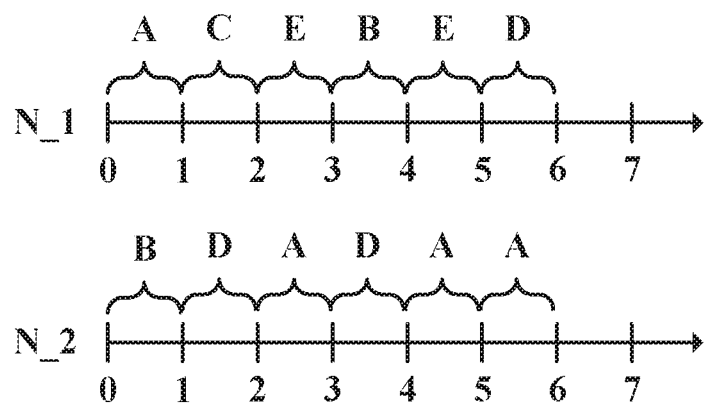

Now referring to FIG. 5B, it shows an example for round robin scheme. The time slot of the round robin scheme is defined as one time unit in FIG. 5B. As shown in the figure, at the beginning, electric vehicle A and B are charged on charging spots N_1 and N_2, respectively. Then, at the end of the first time slot (time 1), electric vehicles A and B are removed from the charging spots N_1 and N_2, and electric vehicles C and D are moved to charging spots N_1 and N_2, respectively. Then, at the end of the second time slot (time 2), electric vehicles C and D are removed from the charging spots N_1 and N_2, and electric vehicles E and A are moved to charging spots N_1 and N_2, respectively. Since the charging of the electric vehicle C is finished, it is removed from the queue waiting for charging. The process repeats for all the electric vehicles until the charging jobs of the electric vehicles A and D end at time 6.

The round robin scheme tends to equally distribute the charging slots of the charging spots amongst the electric vehicles, in order to maximize the output of the charging infrastructure and serving as many customers as possible.

In an embodiment of the present disclosure, for a shortest job first (SJF) scheme, when the charging of the electric vehicle is finished, the electric vehicle will be moved to the waiting area, and another electric vehicle replaces it on the charging spot. Among the electric vehicle in the waiting area, which electric vehicle is moved to the charging spot can be determined based on the job length. That is to say, the electric vehicle with the shortest job length will be moved to the charging spot.

Figure 5C:
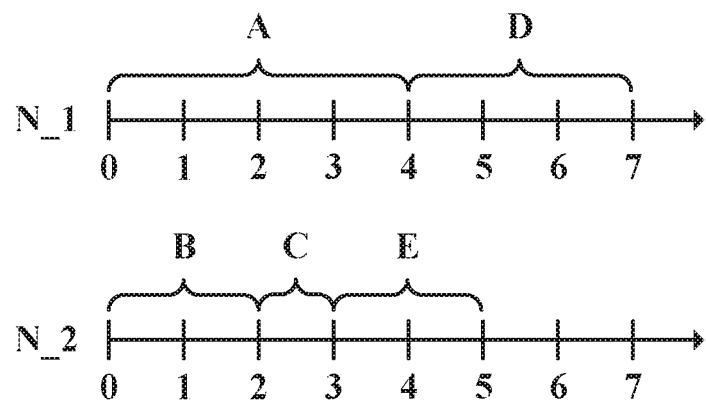

Now referring to FIG. 5C, it shows an example for shortest job first (SJF) scheme. As shown in the figure, at the beginning, electric vehicle A and B are charged on charging spots N_1 and N_2, respectively. Then, after the charging of the electric vehicle B is finished at time 2, electric vehicle C is moved to charging spot N_2. Then, after the charging of the electric vehicle C is finished at time 3, electric vehicle E is moved to charging spot N_2, since electric vehicle E has shorter job length that that of the electric vehicle D. Then, after the charging of the electric vehicle A is finished at time 4, electric vehicle D is moved to charging spot N_1. Finally, the charging of the electric vehicle D ends at time 7.

The SJF scheme allows firstly dealing with the charging tasks having the shortest job length, and thus effectively reducing the number of the electric vehicles waiting for charging and maximizing the throughput of the charging infrastructure.

In an embodiment of the present disclosure, for a shortest remaining time first (SRTF) scheme, similar to the round robin scheme, a time slot is defined on each charging spot, and each time slot can be used by an electric vehicle to charge. At the end of each time slot, the remaining job length of every electric vehicle is determined and compared with each other, and if the electric vehicle in the waiting area has the remaining job length which is shorter than the electric vehicle on charging on the charging spot, the electric vehicle on charging on the charging spot will be replaced with the electric vehicle in the waiting area even though the charging of the electric vehicle on the charging spot has not finished yet.

Figure 5D:
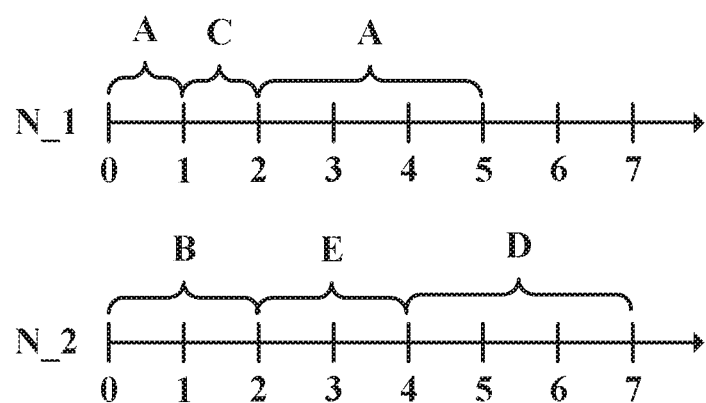

Now referring to FIG. 5D, it shows an example for shortest remaining time first (SRTF) scheme. The time slot of the SRTF scheme is defined as one time unit in the figures. As shown in the figure, at the beginning, electric vehicle A and B are charged on charging spots N_1 and N_2, respectively. Then, at the end of the first time slot (time 1), the remaining job length of each electric vehicle is determined and compared with each other. It can be seen that the electric vehicles B and C have the shortest remaining job length, i.e., one time unit, and thus electric vehicle B continues being charged on charging spot N_2, while electric vehicle A is removed from the charging spots N_1 and electric vehicle C is moved to charging spots N_1. Then, at the end of the second time slot (time 2), electric vehicles B and C are removed from the charging spots N_1 and N_2 since the charging jobs of them are finished, and electric vehicles E having shorting remaining job length (2 time units) and one of electric vehicles A and D having the same remaining job length (3 time units) are moved to charging spots N_1 and N_2, respectively. In this example, electric vehicles E is moved to charging spots N_2, while electric vehicle A is moved to charging spots N_1. Afterward, at the end of the fourth time slot (time 4), electric vehicle E is removed from the charging spot N_2 since the charging job thereof is finished, and the other one of electric vehicles A and D (in this example, electric vehicles D) is moved to charging spot N_2. Finally, the charging of the electric vehicle D ends at time 7.

The SRTF scheme allows to deal with the charging tasks with the shortest job length during each time slot, and thus reduce the number of the electric vehicles waiting for charging more effectively and further maximize the output of the charging infrastructure.

In an embodiment of the present disclosure, for first priority first (FPF) scheme, when the charging of the electric vehicle is finished, the electric vehicle will be moved to the waiting area, and another electric vehicle replaces it on the charging spot. Among the electric vehicle in the waiting area, which electric vehicle is moved to the charging spot can be determined based on the priority thereof. That is to say, the electric vehicle with the highest priority will be moved to the charging spot. The priority of the electric vehicle is based on, for example, the price offered by the customer, the credit points or the priority level of the customer, and so on.

The FPF scheme allows giving the customer the opportunity to pay more money in exchange for a shorter waiting time, or allows a customer who has more credit points or higher priority level to get his electric vehicle charged earlier.

In an embodiment of the present disclosure, for a first go first serve (FGFS) scheme, among the electric vehicle demanding for charging, the charging spots are distributed to the electric vehicle having the earliest pickup time. Then, the charging of the electric vehicle will continue until the charging of the electric vehicle is finished. As had discussed above, the condition in which the charging is finished includes that in which the desired pickup time is reached. Thereafter, the electric vehicle having the earliest pickup time among the rest of electric vehicles is moved to the charging spot for charging.

The first go first serve (FCGS) scheme takes into account the desired pickup time of the customer, and thus even if the customer would like to pick up his/her vehicle shortly after he/she arrived at the charging infrastructure, the electric vehicle can still get charged.

In addition, these schemes can be mixed with each other so as to obtain a mixed scheme. For example, in one embodiment of the present disclosure, the shortest job first (SJF) scheme and the round robin scheme can be mixed in such a way that for the mixed scheme, the electric vehicles are ordered in a charging queue according to their remaining job length. That is to say, at the end of each time slot, the electric vehicle which has a shorter remaining job length will be moved to the charging spot. Also, the electric vehicles may be ordered in a charging queue according to both their waiting time and the job length. That is to say, the electric vehicle having longer waiting time and shorter remaining job length will be moved to the charging spots. Furthermore, in another embodiment of the present disclosure, the first priority first (FPF) scheme can be mixed with any of the first come first serve (FCFS) scheme, the round robin scheme, the shortest job first (SJF) scheme, and the shortest remaining time first (SRTF) scheme, such that the priority of the customer can be reflected in the charging sequence, such that the customer who has higher priority may get his electric vehicle charged earlier.

Then, the predicted usage pattern will then be used to determine which schedule scheme is adopted. Below, the exemplary embodiments describing how the schedule scheme is determined based on the predicted usage pattern will be provided.

In one embodiment of the present disclosure, if the number of the electric vehicles demanding charging is large, for example, the number of the electric vehicles demanding charging exceeds the capacity of the charging infrastructure (e.g., the number of the electric vehicles demanding charging is twice as many as the number of the charging spots of the charging infrastructure), then the first come first serve (FCFS) scheme will be adopted, thus giving a transparent and clear feedback to the customer, such that he/she can make the decision if he/she is willing to wait and use the facility. If the number of the electric vehicles demanding charging is small, for example, the number of the electric vehicles demanding charging is below the capacity of the charging infrastructure (e.g., the number of the electric vehicles demanding charging is less than twice as many as the number of the charging spots of the charging infrastructure), then the round robin scheme will be adopted so as to equally distribute the charging slots amongst the cars in order to maximize the output of the infrastructure and serve as many customers as possible.

In this embodiment, when the number of the electric vehicles demanding charging is large, a fair and transparent schedule scheme, i.e., FCFS scheme, is adopted. However, for the customer who arrives late and whose vehicle is already low in battery (for example, the state of charge is below 30%), i.e., the required power of the electric vehicle is high, he/she may have to wait a rather long time to get his/her vehicle charged.

In view of this, alternatively, in another embodiment of the present disclosure, if the number of the electric vehicles demanding charging is large, when the average required power of the electric vehicles is high (for example, the average state of charge is below 30%) and/or the number of the electric vehicles with high required power is large (for example, more than 70% of the electric vehicle demanding charging), the round robin scheme will be temporarily adopted so as to equally distribute the charging slots amongst the electric vehicle, and thus the above mentioned customer may have his electric vehicle charged for at least one time slot within a short waiting period. Then, after one or more time slots and/or when the average required power becomes low, for example, the first come first serve (FCFS) scheme will be adopted so as to resolve to a fair and transparent schedule scheme.

In addition, in still another embodiment of the present disclosure, if the number of the electric vehicles demanding charging is large, when the average required power of the electric vehicles is low (for example, the average state of charge is above 70%) and/or the number of the electric vehicles with low required power is small (for example, less than 30% of the electric vehicle demanding charging), then the shortest job first (SJF) scheme or the shortest remaining time first scheme will be adopted, so as to effectively reduce the number of the electric vehicles waiting for charging and maximize the throughput of the charging infrastructure. For the customer whose vehicle is already low in battery, he/she may manually shorten the job length by setting the required power of his/her electric vehicle, i.e., the difference between the current state of charge and the target state of charge, to a small value, such that he/she may get his/her vehicle charged earlier. Then, after a given period and/or if the average required power becomes high, for example, the first come first serve (FCFS) scheme will be adopted so as to resolve to a fair and transparent schedule scheme.

In addition, in the above embodiments of the present disclosure, if the number of the electric vehicles demanding charging is small, the round robin scheme will be adopted. However, in this case, if the number of the electric vehicles demanding charging increases rapidly, for example, about two hundreds of electric vehicles will arrive at the charging infrastructure within one hour while the charging infrastructure has only one hundred charging spots, the number of the electric vehicles demanding charging will become high within one hour. Then, in order to deal with the rapidly increasing number of the electric vehicles, the schedule scheme for the situation in which the number of the electric vehicles demanding charging is large can be adopted although the current number of the electric vehicles demanding charging is yet not so large. For example, a first come first serve scheme can be adopted, and thus the process of changing schedule scheme can be performed earlier and the charging infrastructure can be prepared for the burst of incoming customers.

To the contrary, if the number of the electric vehicles demanding charging is small and decrease or increases slowly, for example, about 30 electric vehicles will arrive at the charging infrastructure within one hour, the round robin scheme will be maintained.

Furthermore, in another embodiment of the present disclosure, if the residence time of the electric vehicles is short, for example, the average residence time of the electric vehicles is below 1 hour and/or the number of the electric vehicles with short residence time is large (for example, more than 70% of the electric vehicle demanding charging), the first go first serve (FGFS) scheme will be adopted such that the electric vehicle having short residence time can be charged.

In still another embodiment of the present disclosure, as has been discussed above, the first priority first serve (FPFS) scheme can be mixed with any other schemes to obtain a mixed schedule scheme.

Below, a table summarizes the above embodiments of the present disclosure is provided. In the table, the correspondences between the usage patterns and the schedule schemes is demonstrated, in which the combined usage pattern in each line correspond to the schedule scheme in the same line. However, the correspondences are not limited to the specific examples listed in the table. On one hand, the parameters of the usage pattern can be combined with each other and correspond to different schedule schemes. On the other hand, the schedule schemes can be mixed with each other as well. The person skilled in the art will understand that such table is for exemplary purpose only.

| Usage pattern | | Schedule scheme | |
|---|---|---|---|
| Number of electric vehicle is large | Required power is high | FCFS Round Robin, then FCFS | FPF |
| | Required power is low | SIF/SRTF, then FCFS | |
| Number of electric vehicle is small | Number of electric vehicle increase rapidly | Round Robin FCFS | |
| | Number of electric vehicle increases slowly or decreases | Round Robin | |
| | Residence time is long | Round Robin | |
| | Residence time is short | FGFS | |

In one embodiment of the present application, the schedule scheme is determined based on the predicted current usage pattern. In another embodiment of the present application, the schedule scheme is determined based on the predicted current usage pattern in the near future, for example, in the next hours.

Similarly, based on the above description about the variety of the charging scheme, the person skilled in the art can appreciate many other ways to select the charging scheme according to the predicted usage pattern. The selection for the charging scheme may be varied based on the balance between fairness, efficiency, throughput, and so on.

In one embodiment of the present disclosure, the selection for the charging scheme can be performed periodically, e.g., every one hour. In another embodiment of the present disclosure, the selection for the charging scheme can be performed when the context changes, e.g., when it is lunch time, when it is midnight, when it begins to rain, when there is an event taken place around the charging infrastructure. In still another embodiment of the present disclosure, the selection for the charging scheme can be performed manually pursuant to the instruction from, for example, the operator of the charging infrastructure. In addition, the frequency for changing the scheduling scheme can be limited to a certain value, for example, the scheduling scheme can be changed once per hour.

In one embodiment of the present disclosure, when the charging scheme is changed from one scheme to another scheme, the change will not be done in a binary manner, but rather in a smooth transition through a transition scheme. For example, in one embodiment of the present disclosure, when the charging scheme is changed from the first scheme to the second scheme, the electric vehicle which is currently on the charging spots will continue its charging until the time at which the electric vehicle is to be moved to the waiting area according to the first scheme or its charging is finished, and then which electric vehicle is to be moved to the charging spot and how long it will be charged is decided according to the second scheme. That is to say, the transition of the charging scheme does not affect the electric vehicle which is currently on the charging spot. In another embodiment of the present disclosure, for the transition between the scheduling schemes having time slot (such as round robin scheme and shortest remaining time first scheme) and the scheduling scheme without time slot (such as first come first serve scheme, shortest job first scheme, first priority first scheme, and first go first serve scheme), the transition of the scheduling scheme can be carried out by varying the time slot. For example, when the charging scheme is changed from round robin scheme to first come first serve (FCFS) scheme, the length of the time slot, which is flexible, increases gradually based on the predicted current usage pattern, and finally the time slot is long enough to finish the charging of the electric vehicle within one time slot, which means that the charging scheme is now resolved to FCFS scheme. Similarly, when the charging scheme is changed from first come first serve scheme to round robin scheme, the length of the time slot used for the electric vehicle on charging can be firstly set to a large value, and then decreases gradually until it equals to that length set the round robin scheme.

In an embodiment of the present disclosure, the above correspondence between the usage patterns and the schedule scheme can be predetermined by the manufacture of the charging infrastructure or an entity researching the topic relating to the usage patterns and the schedule scheme, and such correspondence can be modified, for example, by the operator of the charging infrastructure. The correspondences between the usage patterns and the schedule scheme can be stored in a memory of a computing device, and when the usage pattern is predicted, the computing device can used determine the schedule scheme according to the correspondences.

In another embodiment of the present disclosure, any other approach for determining the schedule scheme based on the usage patter can be used.

If there is more than one charging spots available for an electric vehicle, which of the available charging spots is selected to charge the electric vehicle can be determined based on a variety of factors. For example, the electric vehicle can be moved to the charging spot which, for example, is nearest to the electric vehicle, has the longest idle time after previous charging, has the smallest accumulated working times, and so on.

In at least one of the embodiments of the present disclosure, a variety of scheduling schemes having a variety of advantageous can be adopted and thus the flexibility of the charging infrastructure can be improved and thus providing a new and improved method of scheduling for the charging infrastructure.

Now referring back to FIG. 2, in one embodiment of the present disclosure, after determining a schedule scheme for deciding a distribution of charging spots among the electric vehicles at step S202, the steps of performing the determined schedule scheme is optionally comprised in the method of the present disclosure. Please note that since the following steps may not be comprised in the method of the present disclosure, they are denoted in dashed line block.

At step S203, the distribution of the charging spots among the electric vehicles is determining based on the schedule scheme and information about the electric vehicles.

As has been discussed above with reference to the variety of charging scheme, in one embodiment of the present disclosure, the information about the electric vehicle is used along with the charging schedule scheme to decide the distribution of the charging spots among the electric vehicles. The information about the electric vehicles comprises all the information relating to the electric vehicle, including, as has been mentioned above, at least one of: a time at which the electric vehicle arrives at the charging infrastructure, a current state of charge, a desired state of charge, a desired charging energy, a desired pickup time, an accumulated charging time, remaining job length of the electric vehicle, priority of the electric vehicle, the distance between the electric vehicle and the charging spot. For example, for the first come first serve (FCFS) scheme and the round robin scheme, a time at which the electric vehicle arrives at the charging infrastructure and a current state of charge are used to decide the distribution of the charging spots among the electric vehicles. For the shortest job first (SJF) scheme, a current state of charge, an accumulated charging time, a desired state of charge and a desired charging energy are further used to determine the job length. Further, for the shortest remaining time first (SRTF) scheme, remaining job length is used to decide the distribution of the charging spots among the electric vehicles. For the first priority first (FPF) scheme, priority of the electric vehicle is used to decide the distribution of the charging spots among the electric vehicles. For the first go first serve (FGFS) scheme, a desired pickup time is used to decide the distribution of the charging spots among the electric vehicles. In addition, for selecting the charging spots, the distance between the electric vehicle and the charging spot may be considered as well.

It can be understood that some of these kinds of information are detected and received from the electric vehicle, such as a time at which the electric vehicle arrives at the charging infrastructure, a current state of charge, an accumulated charging time, the distance between the electric vehicle and the charging spot. Further, some of these kinds of information are inputted by the customer, such as a desired state of charge, remaining job length of the electric vehicle, a desired charging energy, and a desired pickup time. Moreover, some of them can either be detected from the electric vehicle or be inputted by the customer, such as and priority of the electric vehicle.

Then, at step S204, the distribution of the charging supply phases among the charging spots is decided based on at least one of: status of each charging supply phase and the information about the electric vehicle on the charging spots which are being powered by each charging supply.

The distribution of the charging supply phases is to choose the most suitable supply phase for each charging spots and avoid that charging jobs are centralized on a few supply phases. A variety of information can be used to decide the distribution of the charging supply phases, including at least the status of each charging supply phase, and/or the information about the electric vehicle on the charging spots which are being powered by each charging supply, i.e., the information about the electric vehicles which are being charged by each charging supply. For example, in one embodiment of the present disclosure, at least the available power and/or the supply current of the supply phase can be used as the status of each charging supply phase. Thus, for example, the supply phase having the higher available power and/or lower supply current can be selected as the supply phase for the next electric vehicle on the charging spots. Further, as the information about the electric vehicles, the current state of charge (SOC) and/or the remaining job length of the electric vehicle can be used. Thus, for example, if the electric vehicles which are being charged by the supply phase have higher current states of charge (SOC) and/or shorter remaining job lengths, such supply phase can be selected as the supply phase for the next electric vehicle on the charging spots.

As described above, the above mentioned information for determining the of the charging supply phases among the charging spots can be used independently or in associated with each other. Further, in one embodiment of the present disclosure, each of one or more of these kinds of information can be assigned with a corresponding value, which are defined such that the value is higher if, for example, the supply phase has the higher available power, the supply phase has lower supply current, the electric vehicles which are being charged by the supply phase have higher current states of charge, or the electric vehicles which are being charged by the supply phase have shorter remaining job lengths. Then, a function is provided to calculate a result for each of the supply phase, for example, by summing all the values, and the supply phase with the highest value may be selected as the supply phase for the next electric vehicle on the charging spots.

Then, at step S205, the distribution of an available power of the charging phase among the charging spots is determined based on the power limitations of the supply phase and the information about the electric vehicles on the charging spots which are being powered by each charging supply.

Figure 6A:
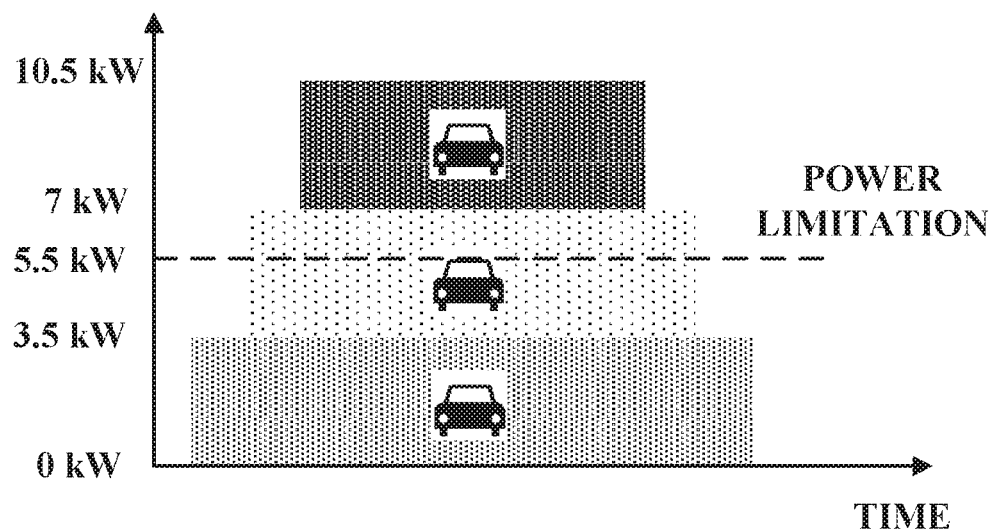
FIG. 6A shows a schematic diagram illustrating the power distribution of the supply phase in prior art.

Now referring to FIG. 6A, there is shown a schematic diagram illustrating the power distribution of the supply phase in prior art. In this example, there is a power limitation of 5.5 kw for the supply phase, and the required power of each electric vehicle is 3.5 kw. As shown in this figure, the supply phase can serve only one electric vehicle at the same time. Thus, under the power limitation, the number of the electric vehicles that can be served by the supply phase at the same time is strongly constrained.

Figure 6B:
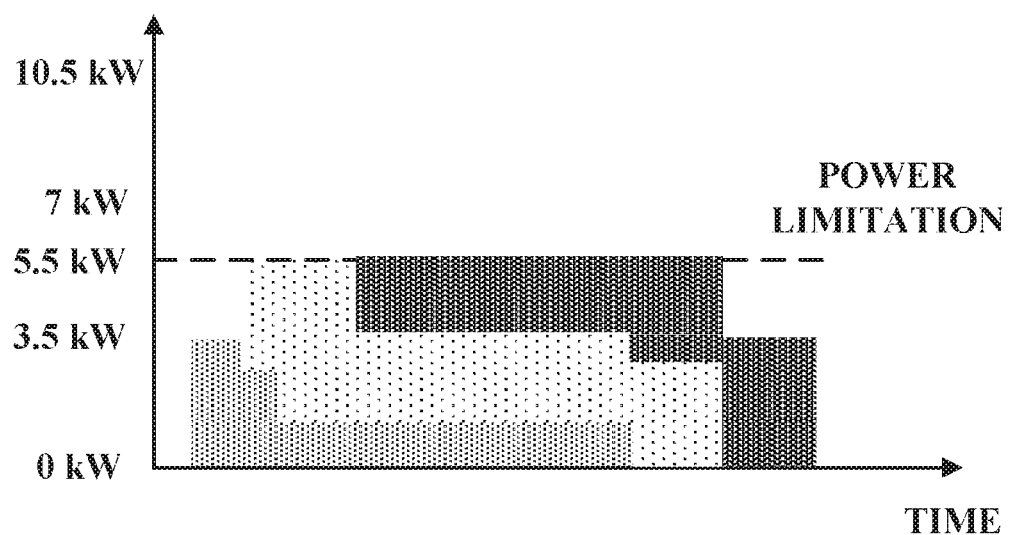
FIG. 6B shows a schematic diagram illustrating the power distribution of the supply phase in accordance with an exemplary embodiment of the present disclosure.

Now referring to FIG. 6B, there is shown a schematic diagram illustrating the power distribution of the supply phase in accordance with an exemplary embodiment of the present disclosure.

In this embodiment of the present disclosure, the available power of the charging phase is distributed to the charging spots according to the information about the electric vehicles currently on the charging spots in view of the constrain of the available power of the charging phase. That is to say, the power distributed to each charging spots is variable, instead of being fixed to a preset value. In the example shown in FIG. 6B, the supply phase may serve for three electric vehicles at the same time, and thus the throughput of the charging infrastructure is significantly increased. In addition, in view of the requirement for the minimal charging power of the electric vehicle, the minimal power supplied to each electric vehicle can also be considered as a constrain as well.

In addition, when distributing the power among the charging spots, the information about the electric vehicles currently on the charging spots is taken into account. For example, the SOC, the accumulated charging time, the desired pickup time and the priority of the electric vehicle into account. In one embodiment of the present disclosure, as the SOC and the accumulated charging time of the electric vehicle increase, the power distributed to it may decrease gradually or in a stepwise manner. In addition, if the desire pickup time is approaching while the SOC of the electric vehicle is still low, the power distributed to it may increase gradually or in a stepwise manner. In addition, if the priority of the electric vehicle is high, it may be distributed with more power than others.

It can be understood that the power distribution of the supply phase may be updated in regular time steps and/or updated whenever an electric vehicle starts, completes or stops its charging on the charging spot powered by the supply phase.

The power distribution in the present embodiment may optimize the available power provided to the charging spot.

In one embodiment of the present disclosure, the operation of moving the electric vehicles between the charging spots and the waiting area and the operation of connecting the charger to the electric vehicle may be carried out manually by the staff members of the charging infrastructure or the customer himself. Alternatively, in another embodiment of the present disclosure, the above processes may be performed automatically through autonomous vehicle and the autonomous charger (e.g., wireless charger or charging robot) without human interaction. It can be seen that in view of the complexity of the schedule schemes discussed in the embodiments of the present disclosure, full autonomous driving and charging will greatly reduce the workload of human, and increase the practicability of the schedule schemes of the embodiments of the present disclosure.

Figure 7:
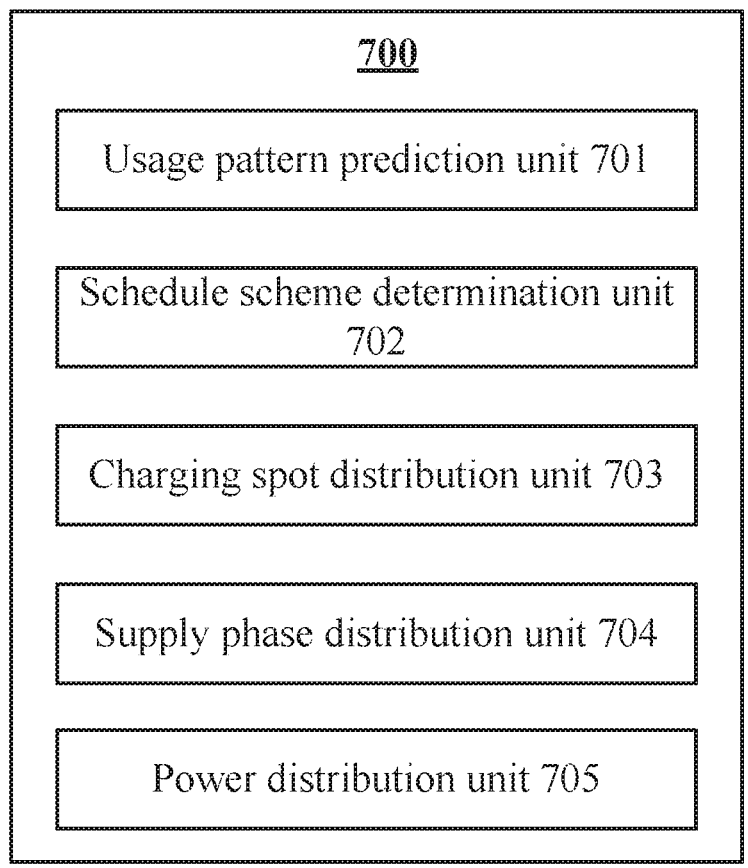
FIG. 7 shows a block diagram of a scheduling apparatus 700 for the charging infrastructure 100 in accordance with an exemplary embodiment of the present disclosure.

Now referring to FIG. 7, there is shown a block diagram of a scheduling apparatus 700 for the charging infrastructure 100 in accordance with an exemplary embodiment of the present disclosure. The blocks of the scheduling apparatus 700 may be implemented by hardware, software, firmware, or any combination thereof to carry out the principles of the present disclosure. It is understood by those skilled in the art that the blocks described in FIG. 7 may be combined or separated into sub-blocks to implement the principles of the present disclosure as described above. Therefore, the description herein may support any possible combination or separation or further definition of the blocks described herein.

Referring to FIG. 7, the scheduling apparatus 700 may include a usage pattern prediction unit 701, a schedule scheme determination unit 702, a charging spot distribution unit 703, a supply phase distribution unit 704 and a power distribution unit 705. Although five units are illustrated in FIG. 7, it is not necessary for the scheduling apparatus 700 to possess all of the five units. For example, as had indicated above, the charging spot distribution unit 703, the supply phase distribution unit 704 and the power distribution unit 705 are optional, and thus is denoted in dashed line. The scheduling apparatus 700 also may include a receiving unit (not shown) and a transmitting unit (not shown) for receiving and transmitting data, information, commands, or the like, respectively.

As had discussed above, the usage pattern prediction unit 701 may be configured to make a prediction for a usage pattern of the charging infrastructure with a context based on historical usage patterns of the charging infrastructure and the contexts of the historical usage patterns. In addition, the schedule scheme determination unit 702 may be configured to determine a schedule scheme for deciding a distribution of charging spots of the charging infrastructure among the electric vehicles based on the usage pattern. Further, the charging spot distribution unit 703 may be configured to determine distribution of the charging spots among the electric vehicles based on the charging schedule scheme and information about the electric vehicles. Furthermore, the supply phase distribution unit 704 may be configured to determine distribution of the charging supply phases among the charging spots based on at least one of: status of each charging supply phase and the information about the electric vehicles on the charging spots which are being powered by each charging supply. At last, the power distribution unit 705 may be configured to determine distribution of an available power of the charging phase among the charging spots based on power limitations of the supply phase and the information about the electric vehicles on the charging spots which are being powered by each charging supply.

Figure 8:
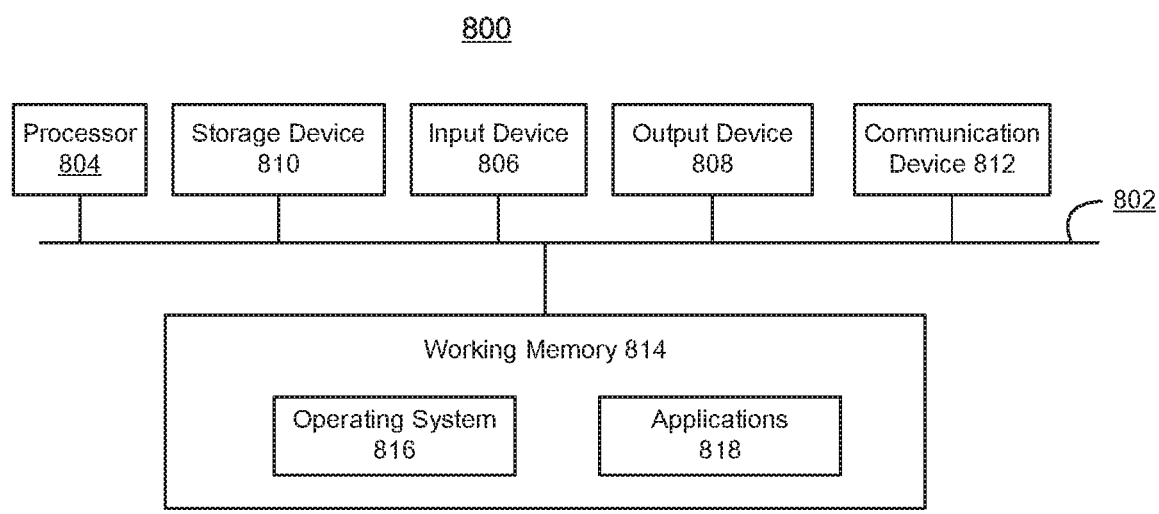
FIG. 8 shows a schematic diagram illustrating a general hardware environment 800 wherein the present disclosure is applicable in accordance with an exemplary embodiment of the present disclosure.

Now referring to FIG. 8, there is shown a schematic diagram illustrating a general hardware environment 800 wherein the present disclosure is applicable in accordance with an exemplary embodiment of the present disclosure.

With reference to FIG. 8, a computing device 800, which is an example of the hardware device that may be applied to the aspects of the present disclosure, will now be described. The computing device 800 may be any machine configured to perform processing and/or calculations, may be but is not limited to a work station, a server, a desktop computer, a laptop computer, a tablet computer, a personal data assistant, a smart phone, an on-vehicle computer or any combination thereof. The aforementioned scheduling apparatus 700 may be wholly or at least partially implemented by the computing device 800 or a similar device or system.

The computing device 800 may comprise elements that are connected with or in communication with a bus 802, possibly via one or more interfaces. For example, the computing device 800 may comprise the bus 802, and one or more processors 804, one or more input devices 806 and one or more output devices 808. The one or more processors 804 may be any kinds of processors, and may comprise but are not limited to one or more general-purpose processors and/or one or more special-purpose processors (such as special processing chips). The input devices 806 may be any kinds of devices that can input information to the computing device, and may comprise but are not limited to a mouse, a keyboard, a touch screen, a microphone and/or a remote control. The output devices 808 may be any kinds of devices that can present information, and may comprise but are not limited to display, a speaker, a video/audio output terminal, a vibrator and/or a printer. The computing device 800 may also comprise or be connected with non-transitory storage devices 810 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 810 may be detachable from an interface. The non-transitory storage devices 810 may have data/instructions/code for implementing the methods and steps which are described above. The computing device 800 may also comprise a communication device 812. The communication device 812 may be any kinds of device or system that can enable communication with external apparatuses and/or with a network, and may comprise but are not limited to a modem, a network card, an infrared communication device, a wireless communication device and/or a chipset such as a Bluetooth™ device, 1302.11 device, WiFi device, WiMax device, cellular communication facilities and/or the like.

The computing device 800 may also comprise a working memory 814, which may be any kind of working memory that may store instructions and/or data useful for the working of the processor 804, and may comprise but is not limited to a random access memory and/or a read-only memory device.

Software elements may be located in the working memory 814, including but are not limited to an operating system 816, one or more application programs 818, drivers and/or other data and codes. Instructions for performing the methods and steps described in the above may be comprised in the one or more application programs 818, and the units of the aforementioned scheduling apparatus 700 may be implemented by the processor 804 reading and executing the instructions of the one or more application programs 818. More specifically, the usage pattern prediction unit 701 of the aforementioned scheduling apparatus 700 may, for example, be implemented by the processor 804 when executing an application 818 having instructions to perform the step S201. In addition, the schedule scheme determination unit 702 of the aforementioned scheduling apparatus 700 may, for example, be implemented by the processor 804 when executing an application 818 having instructions to perform the step S202. Other units of the aforementioned scheduling apparatus 700 may also, for example, be implemented by the processor 804 when executing an application 818 having instructions to perform one or more of the aforementioned respective steps. The executable codes or source codes of the instructions of the software elements may be stored in a non-transitory computer-readable storage medium, such as the storage device(s) 810 described above, and may be read into the working memory 814 possibly with compilation and/or installation. The executable codes or source codes of the instructions of the software elements may also be downloaded from a remote location.

It should also be appreciated that variations may be made in accordance with specific requirements. For example, customized hardware might also be used, and/or particular elements might be implemented in hardware, software, firmware, middleware, microcode, hardware description languages, or any combination thereof. Further, connection to other computing devices such as network input/output devices may be employed. For example, some or all of the disclosed methods and devices may be implemented by programming hardware (for example, a programmable logic circuitry including field-programmable gate arrays (FPGA) and/or programmable logic arrays (PLA)) with an assembler language or a hardware programming language (such as VERILOG, VHDL, C++) by using the logic and algorithm according to the present disclosure.

Those skilled in the art may clearly know from the above embodiments that the present disclosure may be implemented by software with necessary hardware, or by hardware, firmware and the like. Based on such understanding, the embodiments of the present disclosure may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiment of the present disclosure.

The steps of the method 200, 300 and 400 presented above are intended to be illustrative. In some embodiments, method may be accomplished with one or more additional steps not described, and/or without one or more of the steps discussed. Additionally, the order in which the steps of method are illustrated in FIG. 2-4 and described above are not intended to be limiting. In some embodiments, method may be implemented in one or more processing devices (e.g., a digital processor, an analog processor, a digital circuit designed to process information, an analog circuit designed to process information, a state machine, and/or other mechanisms for electronically processing information). The one or more processing devices may include one or more modules executing some or all of the steps of method in response to instructions stored electronically on an electronic storage medium. The one or more processing modules may include one or more devices configured through hardware, firmware, and/or software to be specifically designed for execution of one or more of the steps of method.

Although aspects of the present disclosures have been described by far with reference to the drawings, the methods, systems, and devices described above are merely exemplary examples, and the scope of the present invention is not limited by these aspects, but is only defined by the appended claims and equivalents thereof. Various elements may be omitted or may be substituted by equivalent elements. In addition, the steps may be performed in an order different from what is described in the present disclosures. Furthermore, various elements may be combined in various manners. What is also important is that as the technology evolves, many of the elements described may be substituted by equivalent elements which emerge after the present disclosure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A computer-implemented method for scheduling a charging infrastructure serving a plurality of electric vehicles, comprising:
    making a prediction for a usage pattern of the charging infrastructure with a context based on historical usage patterns of the charging infrastructure and contexts of the historical usage patterns;
    determining a schedule scheme for deciding a distribution of charging spots of the charging infrastructure among the electric vehicles based on the predicted usage pattern; and
    deciding distribution of the charging spots among the electric vehicles based on the schedule scheme and information about the electric vehicles;
    wherein the charging infrastructure comprises a plurality of supply phases for providing power to any of the charging spots, and the method further comprises:
    determining distribution of the supply phases among the charging spots based on at least one of: status of each supply phase and the information about the electric vehicles on the charging spots which are being powered by each charging supply.

2. The method of claim 1, wherein the prediction for the usage pattern of the charging infrastructure is made using a machine learning method or a data mapping method.

3. The method of claim 1, wherein the schedule scheme is determined based on a correspondence between the usage pattern and the schedule scheme.

4. The method of claim 1, further comprising: observing a real usage pattern of the charging infrastructure, wherein the predicted usage pattern is adjustable based on the real usage pattern.

5. The method of claim 1, wherein the schedule scheme comprises at least one of a first come first serve scheme, a round robin scheme, a shortest job first scheme, a shortest remaining time first scheme, a first priority first scheme, a first go first serve scheme, mixed schemes of any of these schedule schemes and transition schemes from one of the schedule schemes to another, and/or the usage pattern of the charging infrastructure comprises at least one of: a number of the electric vehicles demanding charging, a rate of change in the number of the electric vehicles, required power of the electric vehicle, and residence time of the electric vehicle, and/or the context of the usage pattern of the charging infrastructure comprises at least one of: a location of the charging infrastructure, a time of day, a day of week, weather, holiday or not, whether there is an event taking place around the charging infrastructure.

6. The method of claim 1, wherein the information about the electric vehicles comprises at least one of: a time at which the electric vehicle arrives at the charging infrastructure, a current state of charge, a desired state of charge, a desired charging energy, a desired pickup time, an accumulated charging time, remaining job length of the electric vehicle, priority of the electric vehicle, and the distance between the electric vehicle and the charging spot.

7. The method of claim 1, wherein the status of each supply phase comprises at least one of: an available power of the supply phase and a current of the supply phase.

8. The method of claim 1, further comprising: determining distribution of an available power of the charging phase among the charging spots based on power limitations of the supply phase and the information about the electric vehicles on the charging spots which are being powered by each charging supply.

9. The method of claim 1, wherein the electric vehicle is autonomous vehicle and the charging infrastructure has an autonomous charger.

10. A scheduling apparatus for a charging infrastructure serving a plurality of electric vehicles, comprising:
 a memory configured to store a series of computer executable instructions; and
 a processor configured to execute the series of computer executable instructions, wherein the series of computer executable instructions, when executed by the processor, causes the processor to perform operations of: making a prediction for a usage pattern of the charging infrastructure with a context based on historical usage patterns of the charging infrastructure and the contexts of the historical usage patterns, and determining a schedule scheme for deciding a distribution of charging spots of the charging infrastructure among the electric vehicles based on the predicted usage pattern;
 wherein the series of computer executable instructions, when executed by the processor, cause the processor to further perform operations of: deciding distribution of the charging spots among the electric vehicles based on the schedule scheme and information about the electric vehicles; and
 wherein the charging infrastructure comprises a plurality of supply phases for providing power to any of the charging spots, and the series of computer executable instructions, when executed by the processor, causes the processor to further perform operations of: determining distribution of the supply phases among the charging spots based on at least one of: status of each supply phase and the information about the electric vehicles on the charging spots which are being powered by each charging supply.

11. The scheduling apparatus of claim 10, wherein the prediction for the usage pattern of the charging infrastructure is made using a machine learning method or a data mapping method.

12. The scheduling apparatus of claim 10, wherein the schedule scheme is determined based on a correspondence between the usage pattern and the schedule scheme.

13. The scheduling apparatus of claim 10, wherein the series of computer executable instructions, when executed by the processor, causes the processor to further perform operations of: observing a real usage pattern of the charging infrastructure, wherein the predicted usage pattern is adjustable based on the real usage pattern.

14. The scheduling apparatus of claim 10, wherein the schedule scheme comprises at least one of a first come first serve scheme, a round robin scheme, a shortest job first scheme, a shortest remaining time first scheme, a first priority first scheme, a first go first serve scheme, a mixed scheme of any of these schedule schemes and transition schemes from one of the schedule schemes to another, and/or the usage pattern of the charging infrastructure comprises at least one of: a number of the electric vehicles demanding charging, a rate of change in the number of the electric vehicles, required power of the electric vehicle, and residence time of the electric vehicle, and/or the context of the usage pattern of the charging infrastructure comprises at least one of: a location of the charging infrastructure, a time of day, a day of week, weather, holiday or not, whether there is an event taking place around the charging infrastructure.

15. The scheduling apparatus of claim 10, wherein the information about the electric vehicles comprises at least one of: a time at which the electric vehicle arrives at the charging infrastructure, a current state of charge, a desired state of charge, a desired charging energy, a desired pickup time, an accumulated charging time, remaining job length of the electric vehicle, priority of the electric vehicle, and the distance between the electric vehicle and the charging spot.

16. The scheduling apparatus of claim 10, wherein the status of each supply phase comprises at least one of: an available power of the supply phase and a current of the supply phase.

17. The scheduling apparatus of claim 10, wherein the series of computer executable instructions, when executed by the processor, causes the processor to further perform operations of: determining distribution of an available power of the charging phase among the charging spots based on power limitations of the supply phase and the information about the electric vehicles on the charging spots which are being powered by each charging supply.

18. The scheduling apparatus of claim 10, wherein the electric vehicle is an autonomous vehicle and the charging infrastructure has an autonomous charger.

19. A non-transitory computer readable medium having instructions stored thereon that, when executed by a processor, causes the processor to perform a method for scheduling a charging infrastructure serving a plurality of electric vehicles comprising:
 making a prediction for a usage pattern of the charging infrastructure with a context based on historical usage patterns of the charging infrastructure and contexts of the historical usage patterns; and
 determining a schedule scheme for deciding a distribution of charging spots of the charging infrastructure among the electric vehicles based on the predicted usage pattern; and
 deciding distribution of the charging spots among the electric vehicles based on the schedule scheme and information about the electric vehicles;
 wherein the charging infrastructure comprises a plurality of supply phases for providing power to any of the charging spots, and the method further comprises: determining distribution of the supply phases among the charging spots based on at least one of: status of each supply phase and the information about the electric vehicles on the charging spots which are being powered by each charging supply.

* * * * *